Patented May 2, 1933

1,906,730

UNITED STATES PATENT OFFICE

WILLIS F. WASHBURN AND LEIF AAGAARD, OF ST. LOUIS, MISSOURI, ASSIGNORS TO TITANIUM PIGMENT COMPANY, INC., OF NEW YORK, N. Y., A CORPORATION OF MAINE

MANUFACTURE OF COMPOSITE CALCIUM SULPHATE-TITANIUM OXIDE PIGMENTS

No Drawing. Application filed September 24, 1929. Serial No. 394,918.

The source of titanium for the manufacture of pigments is, in practically all cases, ilmenite or a titanium concentrate thereof. This ore is widely distributed in nature; it is theoretically an iron titanate, $FeTiO_3$, seldom if ever corresponds exactly to this composition, which varies, the titanium oxide usually being present from 38 to 55%, ferric oxide from 5 to 30%, and ferrous oxide from 40 to 5%. Small amounts of oxides of other elements, such as calcium, magnesium, silicon, etc., are usually present.

Many methods for its decomposition have been proposed; the one most used today is a digestion with concentrated sulphuric acid. The sulphates thus formed are dissolved in water to a more or less concentrated solution, and, as a preliminary step to the separation of the titanium, all ferric iron is reduced to ferrous, either electrolytically or by the addition of metallic elements, such as metallic iron or zinc. This reduction is usually continued until a small amount of the titanium is in a titanous state, after which any insoluble residue is allowed to settle. A part of the iron is sometimes separated at this stage by lowering the temperature of the solution and allowing ferrous sulphate to crystallize out.

In the manufacture of pigments, the titanium is usually separated from the other elements, except those with which it is chemically combined in the resulting compound, through precipitation by hydrolysis.

One method in causing this hydrolysis to take place is to elevate the temperature of the solution itself; another is to run the solution into a large volume of hot water.

Extenders are white or nearly white materials, which are relatively non-opaque when mixed with non-aqueous vehicles. They are commonly used in coating compositions together with the opaque pigments both as fillers and also for the purpose of imparting thereto specific properties as desired.

Composite titanium pigments are manufactured by introducing into the solution an extender such as blanc fixe, silica, calcium sulphate, etc., boiling until substantially all of the titanium is precipitated by hydrolysis, then separating the resultant composite precipitate and calcining. This general process has worked very well for composites containing relatively low percentages of titanium oxide, up to about 35 to 40 percent, but certain difficulties have been experienced in obtaining satisfactory finished products when manufacturing composites containing higher percentages of titanium oxide.

In our co-pending application for Letters Patent filed September 24, 1929, Serial No. 394,917, we have disclosed an invention whereby excellent composite titanium pigments containing any percentage of titanium oxide up to and including pure titanium oxide may be economically manufactured.

Aqueous solutions of titanium sulphate are in a more or less metastable condition, depending somewhat on the degree of basicity or acidity of the solution. Crystalloid solutions, upon elevation of the temperature, hydrolyze, colloidal material is formed, and precipitation takes place if the temperature is held at or near the boiling point.

We have discovered that the extender calcium sulphate especially when prepared according to a preferred method hereinafter described, which may be caused to exist in the solution in the form of finely divided solid particles, and which is both appreciably soluble and insoluble in the titanium ore solution, when present during hydrolysis, not only accelerates the hydrolytic precipitation of the titanium to a much greater extent than the ordinary relatively insoluble extenders, but also causes the precipitate to take a form having certain physical characteristics, so that upon separating it, washing and calcining, a pigment having excellent color, opacity and other desirable properties is obtained. If an insoluble extender is also present, the precipitate and the resulting pigment will be the composite type; if calcium sulphate is the only extender present and washing is discontinued before complete removal of the calcium sulphate, the pigment will be of the composite type. If the calcium sulphate is completely removed by washing, the pigment will be of the pure titanium oxide type.

This accelerated precipitation we attribute to the large number of fine particles of the calcium sulphate which assist in breaking down the metastability of the solution, by functioning as absorptive nuceli for the compounds of titanium being precipitated. In this respect calcium sulphate acts somewhat after the nature of a catalyst. It apparently functions also in preventing the occlusion of iron and in maintaining an optimum particle size distribution.

As titanium compounds are precipitated, those which remain in solution in the crystalloid state are subjected to further hydrolysis at the elevated temperature, still more of the products of hydrolysis precipitate upon the crystal nuceli present, and so continues until precipitation is substantially complete.

The hydrolytic precipitation of the titanium takes place with the liberation of sulphuric acid from the sulphate solution. Precipitation conditions are therefore constantly changing.

It is conceivable that under the changing conditions of concentrations, temperature, pressure and total acidity in the solution, the calcium sulphate, may partly dissolve in certain places or under certain conditions, and may precipitate and form fresh nuceli in other places or under other conditions.

In our said co-pending application, we have disclosed a method for preparing a preferred form of calcium sulphate which we have found to be peculiarly adapted for the purpose. This method consists in adding a compound of calcium as, for example, hydrated lime or calcium carbonate to concentrated sulphuric acid or to a relatively concentrated aqueous solution of sulphuric acid. Concentrations can be adjusted and temperature controlled in such a manner as to produce an extremely finely divided material having a crystalline structure which microscopic and X-ray examinations have determined to be that of anhydrite.

Such anhydrite differs from the several types of gypsum previously used not only in crystalline structure and form but also in chemical composition, the anhydrite ($CaSO_4$) containing no water, whereas the different types of gypsum ($CaSO_4.2H_2O$) including acicular crystalline gypsum contain water as an integral part of each particle.

We have now also learned that our preferred form of calcium sulphate is especially applicable to the manufacture of composite calcium sulphate-titanium oxide pigments.

We are aware that composite calcium sulphate-titanium oxide pigments have been described, together with processes for their manufacture, in U. S. Letters Patent No. 1,155,462, of October 13, 1915; Reissue No. 14,289, of April 24, 1917; No. 1,205,144, of November 21, 1916; No. 1,223,357, of April 24, 1917; No. 1,234,260, of July 24, 1917; No. 1,240,405, of September 18, 1917; No. 1,288,473, of December 24, 1918; and No. 1,680,316 of August 14, 1928.

Two general processes for the preparation of the calcium sulphate have been described in these patents; in one instance it is formed by reaction between a compound of calcium and the sulphuric acid of the titanium solution; in another instance it is formed in a separate vessel and in such a manner, either by chemical reaction between sulphuric acid and some compound of calcium, or by a recrystallization of natural or artificially prepared gypsum, as to obtain acicular crystals of the hydrated sulphate, $CaSO_4, 2H_2O$.

Our experiments have demonstrated certain objections in these older processes. The greater the percentage of titanium oxide desired in the finished product, especially above 35 to 40%, the greater the difficulties in obtaining products of good color and opacity. The opacity per unit of titanium oxide present falls off rapidly as its percentage in the composite is increased. The color becomes poorer also with increasing percentages of titanium oxide. This difficulty in obtaining good color and opacity we believe is due in part to the limit in the capacity of the calcium sulphate nuclei to absorb the compounds of titanium being precipitated.

In the old known processes of manufacturing composite calcium sulphate-titanium oxide pigments, as well as composite titanium oxide pigments other than those in which calcium sulphate is the extender used, containing higher percentages of titanium oxide, say above 35 to 40%, there is often formed, during the hydrolytic precipitation of titanium compounds, considerable colloidal, or semi-colloidal, material which remains unattached to the extender, and which causes filtration and washing difficulties.

Unless the titanium solution is reasonably free from iron, a condition which is arrived at only after considerable expense, there is danger of occluding iron in forming calcium sulphate by a reaction between a calcium compound and the sulphuric acid of the solution, with the result that a pigment of poor color is thus frequently obtained.

In supplying a nuclear substance for absorbing the compounds of titanium being precipitated, it is evident that as fine a state of subdivision as possible is highly desirable. The separately prepared acicular crystals, while in most cases free from occluded iron, are relatively large in size, their length being several times their diameter.

Furthermore we have discovered that acicular crystals of hydrated calcium sulphate are somewhat unstable and also have a tendency to grow in size during the hydrolytic precipitation of the titanium compounds, thereby often occluding iron or other impurities. In the formation of these acicular crystals, the concentrations required are such that a filtration is necessary before mixing with the titanium solution. This step, aside from being an expensive operation in itself, is attended by considerable losses of calcium sulphate on account of the solubility of this compound.

Our method of preparation of calcium sulphate results in an extremely fine state of subdivision, and thus per unit weight more particles are supplied to act as absorptive nuclei. The expensive filtration of the calcium sulphate before mixing with the titanium solution is eliminated in our process and material economies are thereby effected. It is entirely practicable, when operating according to our process, to form the calcium sulphate in the same tank in which the precipitation of the titanium compounds is later caused to take place.

The acid is first added to the tank and this is followed by the lime or calcium carbonate slurry whereby a thick pulp of calcium sulphate, requiring no further concentration, is formed. Considerable heat of reaction is evolved which is conserved, resulting in another economy. The titanium solution is then added, and whatever additional heat required to cause precipitation of the titanium by hydrolysis is then applied.

Our form of calcium sulphate is such that during the hydrolytic precipitation of titanium compounds, little, if any, colloidal or semi-colloidal material remains unattached to the calcium sulphate nuclei, even in manufacturing a composite pigment containing a very high percentage of titanium oxide. The titanium compounds being precipitated largely coalesce with the calcium sulphate. After substantially complete precipitation, the composite precipitate is filtered or separated from its mother liquor by other means and washed with water. It is finally calcined at a temperature ranging between 700° C. and 1,200° C.

In order that our invention may be more clearly understood and practised by any one skilled in the art, we now give two examples by which we have prepared the calcium sulphate and also obtained excellent pigments, although we do not wish to be limited thereby.

Composite pigments of good opacity, per unit of titanium oxide contained therein, and of good color may be manufactured in which the two components are present in any proportions whatsoever. There is a wide range as to the temperatures and concentrations of the acid and lime slurry used in forming the calcium sulphate. Many variations in methods of procedure are permissible, all of which result in the products desired.

*Example I.—30% titanium oxide*

An ilmenite ore was brought into solution with sulphuric acid, all of the iron and a small part of the titanium were reduced to lower valences, by a well known method, and the insoluble residue was allowed to settle. The clear supernatant solution, which was then used in carrying out the example, analyzed as follows:—

| | Per cent |
|---|---|
| Titanium oxide ($TiO_2$) | 7.02 |
| Ferrous oxide (FeO) | 6.85 |
| Uncombined sulphuric acid | 2.26 |

To 372 pounds of 78% sulphuric acid, at a temperature of 20° C., was added a slurry of 95 pounds of hydrated lime in 110 gallons of water at 70° C. The calcium sulphate thus formed was mixed with 900 pounds of the above ilmenite solution. The mixture was then heated to boiling and boiled until about 95% of the titanium was precipitated, after which the composite precipitate was separated, washed, dried and calcined at 900° C. The yield was found by analysis to contain:

| | |
|---|---|
| Titanium oxide | 29.6% |
| Calcium sulphate | 70.3% |
| Other substances | Traces |
| Sp. gr. of pigment | 3.2 |

*Example II.—75% titanium oxide*

An ilmenite ore was brought into solution with sulphuric acid, all of the iron and a small part of the titanium were reduced to lower valences, by a well-known method, and the insoluble residue was allowed to settle. The clear supernatant solution, which was then used in carrying out the example, analyzed as follows:

| | Per cent |
|---|---|
| Titanium oxide ($TiO_2$) | 6.07 |
| Ferrous oxide (FeO) | 5.88 |
| Uncombined sulphuric acid | 6.45 |

To 106 pounds of 78% sulphuric acid, at a temperature of 20° C., was added a slurry of 39 pounds of hydrated lime in 44 gallons of water at 70° C. The calcium sulphate thus formed was mixed with 2,600 pounds of the above ilmenite solution. The mixture was then heated to boiling and boiled unit about 95% of the titanium was precipitated, after which the composite precipitate was separated, washed, dried and calcined at 900° C. The yield was found by analysis to contain:

| | |
|---|---|
| Titanium oxide | 74.7% |
| Calcium sulphate | 25.2% |
| Other substances | Traces |
| Sp. gr. of pigment | 3.6 |

Both of these pigments are characterized by their clear white color, excellent brightness, and resistance to light. Clear tones are obtained with tinting colors. The pigment particles are extremely finely divided, and also soft and smooth in texture. They are readily miscible with the media in use in the paint, varnish, rubber and other processing industries, and when mixed with these media have great obscuring power.

Having now disclosed our invention, we desire that as broad an interpretation may be placed thereon as is permissible in view of the prior art.

We claim as our invention:

1. The process for the manufacture of composite calcium sulphate-titanium oxide pigments which consists in mixing concentrated sulphuric acid with hydrated lime to produce calcium sulphate in the crystalline form of anhydrite, mixing the resultant calcium sulphate with a sulphuric acid solution of titanium, elevating the temperature to cause precipitation of titanium compounds by hydrolysis, separating the composite precipitate, washing it and calcining it at a temperature ranging between 700° C. and 1200° C.

2. The process for the manufacture of composite calcium sulphate-titanium oxide pigments which consists in mixing hydrated lime with 78% sulphuric acid to produce calcium sulphate in the crystalline form of anhydrite, mixing the resultant calcium sulphate with a sulphuric acid solution of titanium, elevating the temperature to cause precipitation of titanium compounds by hydrolysis, separating the composite precipitate, washing it and calcining it at a temperature ranging between 700° C. and 1200° C.

3. The process for the manufacture of composite calcium sulphate-titanium oxide pigments which consists in mixing lime with concentrated sulphuric acid to produce calcium sulphate in the crystalline form of anhydrite, mixing the resultant calcium sulphate with a sulphuric acid solution of titanium, elevating the temperature to cause precipitation of titanium compounds by hydrolysis, separating the composite precipitate, washing it and calcining it at a temperature ranging between 700° C. and 1200° C.

4. The process for the manufacture of composite calcium sulphate-titanium oxide pigments which consists in mixing calcium carbonate with 78% sulphuric acid to produce calcium sulphate in the crystalline form of anhydrite, mixing the resultant calcium sulphate with a sulphuric acid solution of titanium elevating the temperature to cause precipitation of titanium compounds by hydrolysis, separating the composite precipitate, washing it and calcining it at a temperature ranging between 700° C. and 1200° C.

5. The process for the manufacture of composite calcium sulphate-titanium oxide pigments which consists in mixing calcium carbonate with concentrated sulphuric acid to produce calcium sulphate in the crystalline form of anhydrite, mixing the resultant calcium sulphate with a sulphuric acid solution of titanium, elevating the temperature to cause precipitation of titanium compounds by hydrolysis, separating the composite precipitate, washing it and calcining it at a temperature ranging between 700° C. and 1200° C.

6. The process for the manufacture of composite calcium sulphate-titanium oxide pigments which consists in mixing artificially and separately prepared calcium sulphate having the crystalline structure of anhydrite, with a mineral acid solution of titanium, elevating the temperature to cause precipitation of titanium compounds by hydrolysis, separating the composite precipitate, washing it and calcining it at a temperature ranging between 700° C. and 1200° C.

7. The process for the manufacture of composite calcium sulphate-titanium oxide pigments which consists in mixing artificially and separately prepared calcium sulphate having the crystalline structure of anhydrite, with a sulphuric acid solution of titanium, elevating the temperature to cause precipitation of titanium compounds by hydrolysis, separating the composite precipitate, washing it and calcining it at a temperature ranging between 700° C. and 1200° C.

8. The process for the manufacture of composite calcium sulphate-titanium oxide pigments which consists in mixing a concentrated aqueous slurry of hydrated lime with 78% sulphuric acid to produce calcium sulphate in the crystalline form of anhydrite, mixing the resultant calcium sulphate with a sulphuric acid solution of titanium, elevating the temperature to cause precipitation of titanium compounds by hydrolysis, separating the composite precipitate, washing it and calcining it at a temperature ranging between 700° C. and 1200° C.

9. The process for the manufacture of composite calcium sulphate-titanium oxide pigments which consists in mixing a concentrated aqueous slurry of hydrated lime with concentrated sulphuric acid to produce calcium sulphate in the crystalline form of anhydrite, mixing the resultant calcium sulphate with a sulphuric acid solution of titanium, elevating the temperature to cause precipitation of titanium compounds by hydrolysis, separating the composite precipitate, washing it and calcining it at a temperature ranging between 700° C. and 1200° C.

10. The process for the manufacture of composite calcium sulphate-titanium oxide pigments which consists in adding hydrated lime to a concentrated aqueous solution of sulphuric acid to produce calcium sulphate in the crystalline form of anhydrite, mixing the resultant calcium sulphate with a sulphuric acid solution of titanium, elevating the temperature to cause precipitation of titanium compounds by hydrolysis, separating the composite precipitate, washing it and calcining it at a temperature ranging between 700° C. and 1200° C.

11. The process for the manufacture of composite calcium sulphate-titanium oxide pigments which consists in adding hydrated lime to concentrated sulphuric acid to produce calcium sulphate in the crystalline form of anhydrite, mixing the resultant calcium sulphate with a sulphuric acid solution of titanium, elevating the temperature to cause precipitation of titanium compounds by hydrolysis, separating the composite precipitate, washing it and calcining it at a temperature ranging between 700° C. and 1200° C.

12. The process for the manufacture of composite calcium sulphate-titanium oxide pigments which consists in adding a concentrated aqueous slurry of hydrated lime to a concentrated aqueous solution of sulphuric acid to produce calcium sulphate in the crystalline form of anhydrite, mixing the resultant calcium sulphate with a sulphuric acid solution of titanium, elevating the temperature to cause precipitation of titanium compounds by hydrolysis, separating the composite precipitate, washing it and calcining it at a temperature ranging between 700° C. and 1200° C.

13. The process for the manufacture of composite calcium sulphate-titanium oxide pigments which consists in adding a concentrated aqueous suspension of hydrated lime to concentrated sulphuric acid to produce calcium sulphate in the crystalline form of anhydrite, mixing the resultant calcium sulphate with a sulphuric acid solution of titanium, elevating the temperature to cause precipitation of titanium compounds by hydrolysis, separating the composite precipitate, washing it and calcining it at a temperature ranging between 700° C. and 1200° C.

14. The process for the manufacture of composite calcium sulphate-titanium oxide pigments which consists in adding lime to concentrated aqueous solution of sulphuric acid to produce calcium sulphate in the crystalline form of anhydrite, mixing the resultant calcium sulphate with a sulphuric acid solution of titanium, elevating the temperature to cause precipitation of titanium compounds by hydrolysis, separating the composite precipitate, washing it and calcining it at a temperature ranging between 700° C. and 1200° C.

15. In a process for the manufacture of composite calcium sulphate-titanium oxide pigments, the steps which consist in separately forming calcium sulphate in the crystalline form of anhydrite for hydrolytic precipitation with titanium compounds in solution by mixing a concentrated aqueous slurry of hydrated lime with 78% sulphuric acid, and mixing the resulting calcium sulphate with a sulphuric acid solution of titanium.

16. In a process for the manufacture of composite calcium sulphate-titanium oxide pigments, the steps which consist in separately forming calcium sulphate in the crystalline form of anhydrite for hydrolytic precipitation with titanium compounds in solution by mixing a concentrated aqueous slurry of hydrated lime with concentrated sulphuric acid, and mixing the resulting calcium sulphate with a sulphuric acid solution of titanium.

17. In a process for the manufacture of composite calcium sulphate-titanium oxide pigments, the steps which consist in separately forming calcium sulphate in the crystalline form of anhydrite for hydrolytic precipitation with titanium compounds in solution by adding hydrated lime to a concentrated aqueous solution of sulphuric acid and mixing the resulting calcium sulphate with a sulphuric acid solution of titanium.

18. As a new article, an uncalcined composite precipitate comprising hydrated titanium oxide and calcium sulphate in the crystalline form of anhydrite.

19. As a new article, an uncalcined composite precipitate comprising hydrated titanium oxide and calcium sulphate, a part of which is in the crystalline form of anhydrite.

20. As a new article, a calcined pigment comprising titanium oxide and calcium sulphate in the crystalline form of anhydrite.

21. As a new article, a calcined pigment comprising titanium oxide and calcium sulphate, a part of which is in the crystalline form of anhydrite.

WILLIS F. WASHBURN.
LEIF AAGAARD.